US006796455B2

(12) United States Patent
Schmidt

(10) Patent No.: US 6,796,455 B2
(45) Date of Patent: Sep. 28, 2004

(54) BLADE DISPENSER ASSEMBLY

(75) Inventor: G. Gerry Schmidt, Newport Beach, CA (US)

(73) Assignee: Pacific Handy Cutter, Inc., Costa Mesa, CA (US)

( * ) Notice: Subject to any disclaimer, the term of this patent is extended or adjusted under 35 U.S.C. 154(b) by 86 days.

(21) Appl. No.: 10/005,791

(22) Filed: Nov. 8, 2001

(65) Prior Publication Data

US 2003/0085236 A1 May 8, 2003

(51) Int. Cl.[7] .......................... B65G 59/00; B65H 3/00; G07F 11/16

(52) U.S. Cl. ....................... 221/256; 221/255; 221/268; 221/102; 221/228; 221/246; 221/279; 221/232; 206/16

(58) Field of Search ................................ 221/102, 228, 221/232, 238, 246, 255, 256, 268, 279; 206/16

(56) References Cited

U.S. PATENT DOCUMENTS

| | | | | | |
|---|---|---|---|---|---|
| 1,652,685 | A | * | 12/1927 | Schick | 30/47 |
| 2,043,046 | A | * | 6/1936 | Kuhnl | 206/16 |
| 2,080,038 | A | * | 5/1937 | Frederickson | 312/35 |
| 2,182,615 | A | | 12/1939 | Johnson | |
| 2,418,677 | A | * | 4/1947 | Testi | 206/16 |
| 2,472,051 | A | * | 5/1949 | Testi | 206/16 |
| 2,792,933 | A | * | 5/1957 | Butlin | 206/16 |
| 2,889,076 | A | * | 6/1959 | Van Schie | 221/232 |
| 3,502,203 | A | * | 3/1970 | Braginetz | 206/16 |
| 3,542,245 | A | * | 11/1970 | Braginetz | 221/232 |
| 3,650,433 | A | * | 3/1972 | Robertson | 221/232 |
| 3,827,597 | A | * | 8/1974 | Braginetz | 221/232 |
| 3,864,896 | A | * | 2/1975 | Bally, Jr. | 53/159 |
| 3,910,455 | A | * | 10/1975 | Ferraro | 221/102 |
| 3,941,244 | A | * | 3/1976 | Braginetz | 206/360 |
| 4,114,780 | A | * | 9/1978 | Sharon | 221/101 |
| 4,379,514 | A | * | 4/1983 | Joffe | 221/279 |
| 4,789,080 | A | | 12/1988 | Iten | |
| 4,826,042 | A | | 5/1989 | Vujovich | |
| 4,850,512 | A | | 7/1989 | Vujovich | |
| 4,978,031 | A | * | 12/1990 | Lembke | 221/102 |
| 5,139,167 | A | * | 8/1992 | McCarthy | 221/312 A |
| 5,251,783 | A | * | 10/1993 | Gringer | 221/102 |
| 5,409,133 | A | | 4/1995 | Gringer | |
| D403,954 | S | * | 1/1999 | Okada et al. | D9/339 |
| 6,158,616 | A | * | 12/2000 | Huang | 221/268 |
| 6,446,802 | B1 | * | 9/2002 | Lutz et al. | 206/354 |

* cited by examiner

*Primary Examiner*—Donald P. Walsh
*Assistant Examiner*—Michael E Butler
(74) *Attorney, Agent, or Firm*—Henricks, Slavin & Holmes LLP

(57) ABSTRACT

A blade dispenser assembly includes a housing and an integrally formed shuttle mechanism which functions to dispense one blade at a time from the bottom of a stack of blades held within the housing. The shuttle mechanism is configured to engage a bottommost blade in the stack when in a closed position and to carry the engaged blade with it when the shuttle mechanism is moved to an opened position. In the opened position, the shuttle mechanism is partially extended from the housing and securely holds and displays the withdrawn blade. An exemplary preferred shuttle mechanism is pivotally coupled to the housing and includes an arm portion that allows a person to pivot the shuttle mechanism away from the housing while keeping the person's hand safely away from the blade being withdrawn. The blade dispenser assembly also includes a follower mechanism that is positioned adjacent the top of the stack of blades and mechanically coupled to the housing such that it descends with the stack of blades as successive blades are withdrawn from the bottom of the stack and such that it retains its position relative to the housing when the assembly is turned upside down, thereby functioning as a one-way ratchet that prevents the stack of blades from falling away from the shuttle mechanism.

8 Claims, 11 Drawing Sheets

BLADE DISPENSER ASSEMBLY

CROSS-REFERENCE TO RELATED APPLICATIONS

This application is related to U.S. design patent application Ser. No. 10/005,791 Jan. 23, 2002 entitled "Blade Dispenser Apparatus" filed herewith.

BACKGROUND OF THE INVENTION

1. Field of Invention

The present invention relates generally to a blade dispenser and, more specifically, to a blade dispenser assembly with a housing, a shuttle mechanism for safely dispensing individual blades from a stack of blades stored within the housing, and a follower mechanism for providing a partition between new and used blade portions of the housing and for preventing the stack of blades from falling away from the shuttle mechanism when the blade dispenser assembly is turned upside down.

2. Description of the Related Art

A variety of apparatuses are known for dispensing a single razor blade at a time from a stack of blades. For example, U.S. Pat. No. 4,789,080 to Iten discloses a utility blade dispenser formed to expose the side edge of a utility blade while it is still at the bottom of the stack of blades within the dispenser, so that a sideways pushing force may be applied by a person's finger to separate this bottommost blade from the stack. Similarly, U.S. Pat. No. 4,826,042 to Vujovich discloses a blade dispenser with a knob that a person slides to eject a blade from the dispenser.

While such blade dispensers are not likely to present a danger to a careful operator, it would nevertheless be desirable to be able to provide a blade dispenser apparatus that eliminates the need for a person to make any direct contact with a blade in order to effect an initial lateral separation of that blade from the other blades in the stack—a motion, that if not done carefully, can result in the blade rapidly ejecting from the dispenser and causing an injury. A clumsily withdrawn blade can also fall to the floor where it might get lost and later be discovered by a crawling infant or small child. It would also be desirable to be able to provide a blade dispenser apparatus that is free of mechanisms that potentially extend a blade from the dispenser toward the user's hand.

It would be desirable to be able to simultaneously ensure the integrity of the stack of blades within the dispenser, independent of the orientation of the dispenser relative to the direction of forces such as gravity incident upon the dispenser. Moreover, it would be desirable to be able to provide a safe and convenient way to also use such a blade dispenser apparatus as a disposal mechanism for receiving used blades without interfering with the aforementioned functionality.

SUMMARY OF THE INVENTION

A blade dispenser assembly according to an exemplary preferred embodiment of the present invention includes a housing and an integrally formed shuttle mechanism which functions to safely dispense one blade at a time from the bottom of a stack of new blades held within the housing. The shuttle mechanism is configured to engage a bottommost blade in the stack when in a closed position and to carry the engaged blade with it when the shuttle mechanism is thereafter moved to an opened position. In the opened position, the shuttle mechanism is partially extended from the housing and securely holds and displays the withdrawn blade. An exemplary preferred shuttle mechanism is pivotally coupled to the housing and includes an arm portion that allows a person to pivot the shuttle mechanism away from the housing while keeping the person's hand safely away from the blade being withdrawn.

An exemplary preferred blade dispenser assembly also includes a follower mechanism which functions as a one-way ratchet that prevents the stack of blades from shifting their orientation within the assembly and separates the stack of new blades from a used blade receptacle within the assembly. The follower mechanism ensures the integrity of the stack of new blades within the housing and, more specifically, maintains the positioning of the stack of blades adjacent the shuttle mechanism.

According to an exemplary preferred embodiment of the present invention, a blade dispenser assembly includes: a housing defining a vertical channel that laterally supports a stack of blades thereabout; a shuttle mechanism mechanically coupled to the housing such that the shuttle mechanism withdraws a blade from the bottom of the stack when the shuttle mechanism is moved to an opened position in which a portion of the shuttle mechanism is extended from the housing; and a follower mechanism mechanically coupled to the housing such that the follower mechanism descends within the housing adjacent a top portion of the stack as blades are successively removed from the bottom of the stack. The shuttle mechanism is formed such that the blade withdrawn from the housing by the shuttle mechanism is accessible for removal from the shuttle mechanism when the shuttle mechanism is in its opened position, and such that a next blade of the stack is mechanically engaged by the shuttle mechanism after the blade withdrawn from the housing is removed from the shuttle mechanism and the shuttle mechanism is moved back to a closed position beneath the stack.

In a preferred embodiment, the follower mechanism separates the housing into a lower portion for new blades and an upper portion for used blades, and the upper portion includes an aperture sized to receive the used blades. In a preferred embodiment, the follower mechanism is formed to function as a one-way ratchet such that when the blade dispenser assembly is turned upside down the follower mechanism maintains its position relative to the housing thereby preventing the unused blades from falling away from the shuttle mechanism.

According to another exemplary preferred embodiment of the present invention, a blade dispenser assembly includes: a housing sized to receive a stack of blades; and a shuttle pivotally coupled to the housing and shaped such that a blade from the stack is engaged by the shuttle when the shuttle is in a closed position and such that the blade is drawn from the stack and extended from the housing when the shuttle is moved to an opened position.

In a preferred embodiment, the shuttle includes a blade receiving surface and a plurality of ridges at peripheral portions of the blade receiving surface. In a preferred embodiment, the housing includes a front side with a recessed portion, and the shuttle includes an arm portion that fits within the recessed portion when the shuttle is in its closed position. In a preferred embodiment, the shuttle includes a stop member positioned to make contact with a portion of the housing once the shuttle has been pivoted a predetermined amount relative to the housing. In a preferred embodiment, the housing includes a post member, and the shuttle includes a sleeve that receives the post member therein pivotally coupling the shuttle to the housing. In a preferred embodiment, the post member and sleeve are formed such that a full bearing surface is provided for pivoting the shuttle relative to the housing.

According to another exemplary preferred embodiment of the present invention, a blade dispenser assembly includes: a housing configured to hold a stack of blades and to facilitate dispensing one blade at a time from the housing; a shuttle member mechanically coupled to the housing and shaped such that the shuttle member engages a blade from the bottom of the stack when the shuttle member is in a closed position and such that the shuttle member extends from the housing with the engaged blade when the shuttle member is moved to an opened position; and a follower member positioned above the stack and mechanically coupled to the housing such that the follower member can only move in one direction within the housing, descending with a top portion of the stack as the stack becomes smaller.

In a preferred embodiment, the housing is formed with a vertical channel and includes a follower guide member that faces the vertical channel, and the follower member includes a main portion shaped to fit within the housing and a cantilevered portion positioned between the vertical channel and the follower guide member. In a preferred embodiment, the follower member includes an attaching portion between the main portion and the cantilevered portion, the attaching portion fitting within the vertical channel. In a preferred embodiment, the main portion and the cantilevered portion approximately form a right angle.

The above described and many other features and attendant advantages of the present invention will become apparent as the invention becomes better understood by reference to the following detailed description when considered in conjunction with the accompanying drawings.

BRIEF DESCRIPTION OF THE DRAWINGS

Detailed description of preferred embodiments of the inventions will be made with reference to the accompanying drawings.

DETAILED DESCRIPTION OF THE PREFERRED EMBODIMENTS

The following is a detailed description of the best presently known mode of carrying out the invention. This description is not to be taken in a limiting sense, but is made merely for the purpose of illustrating the general principles of the invention.

Figure 2:
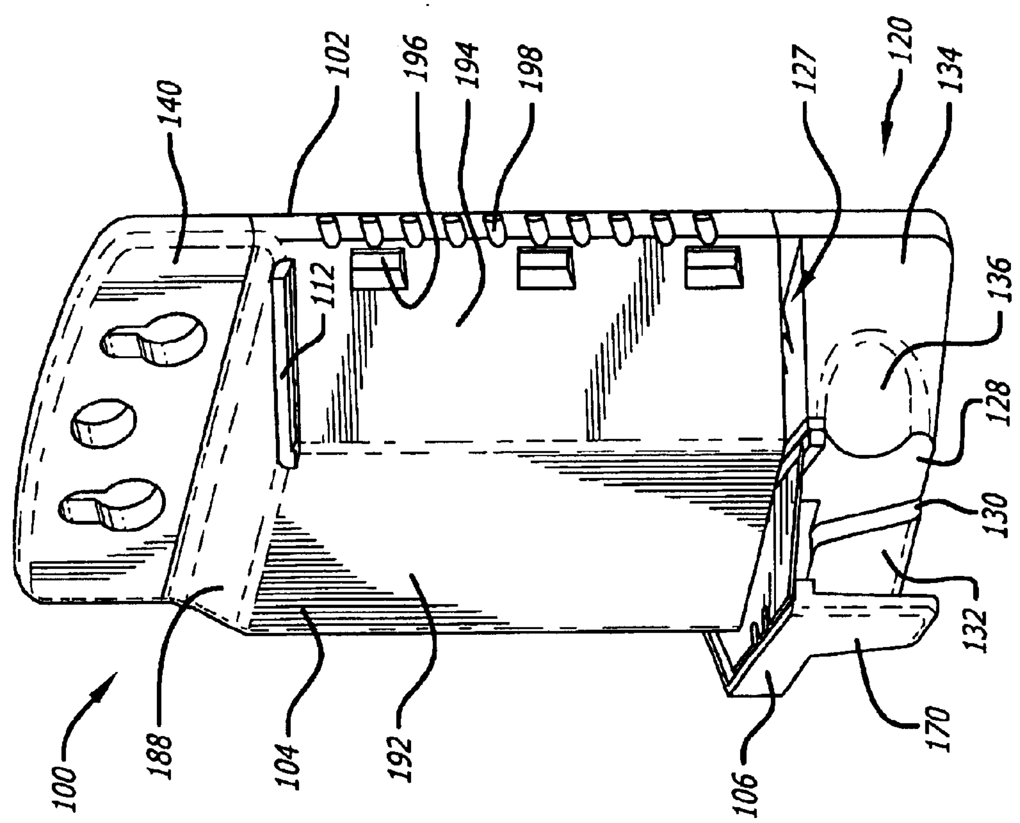
FIG. 2 shows the blade dispenser assembly of FIG. 1 with the shuffle mechanism in an opened position.
Figure 1:
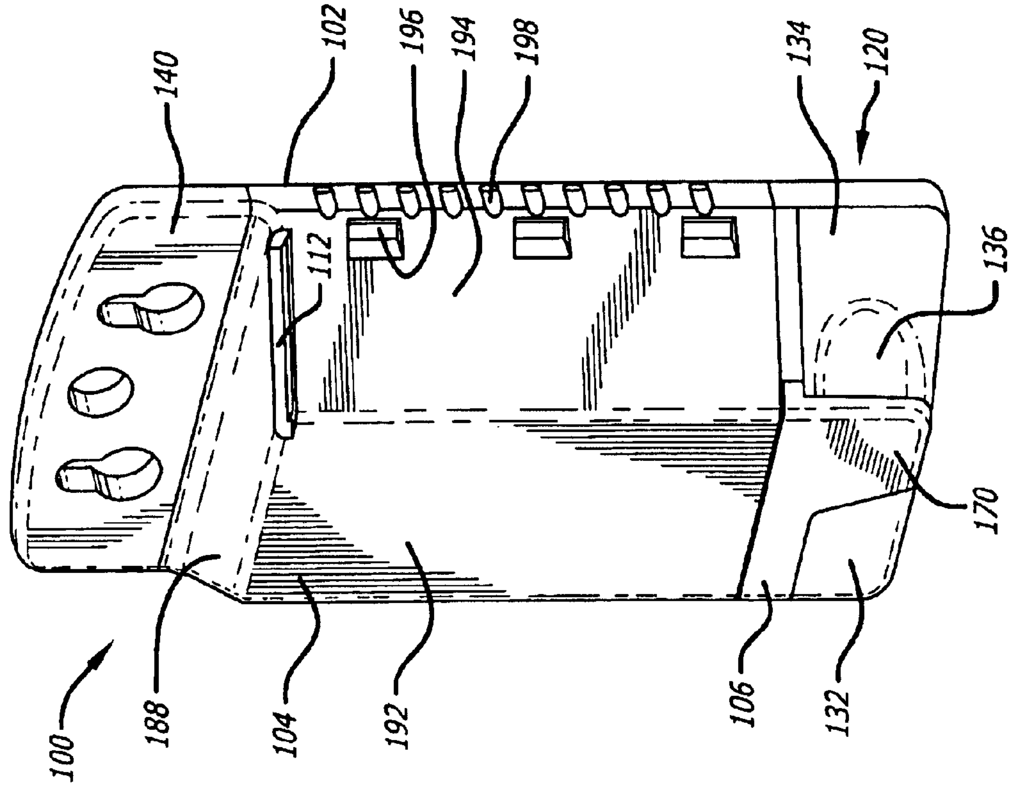
FIG. 1 is a front perspective view of an exemplary preferred blade dispenser assembly according to the present invention shown with its shuttle mechanism in a closed position.
Figure 3:
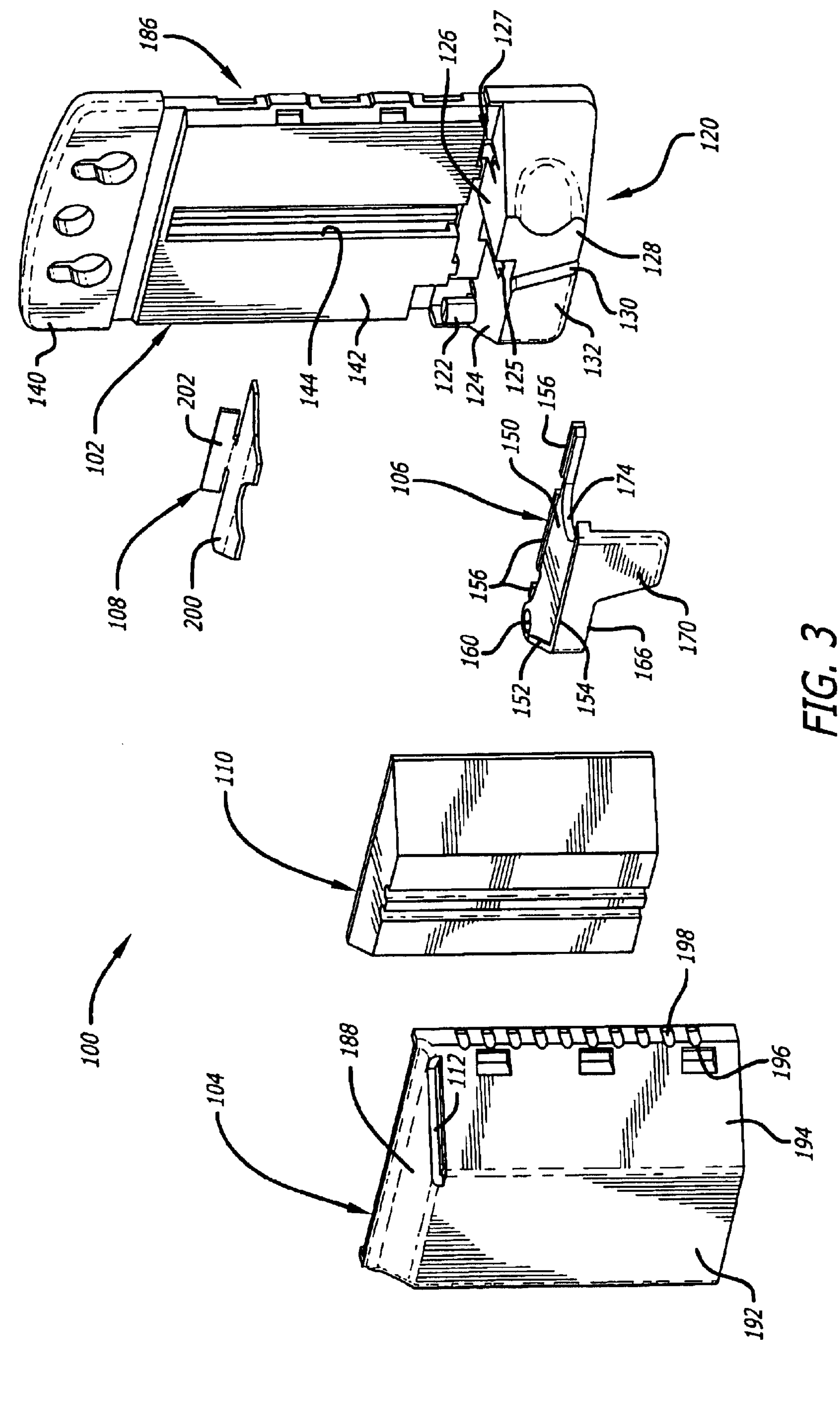
FIG. 3 is an exploded view of the blade dispenser assembly of FIG. 1.
Figure 4D:
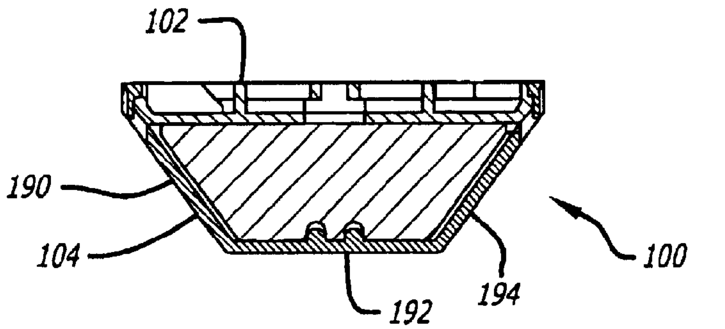
FIG. 4D is a cross-sectional view of the blade dispenser assembly along line A—A of FIG. 4A.
Figure 4C:
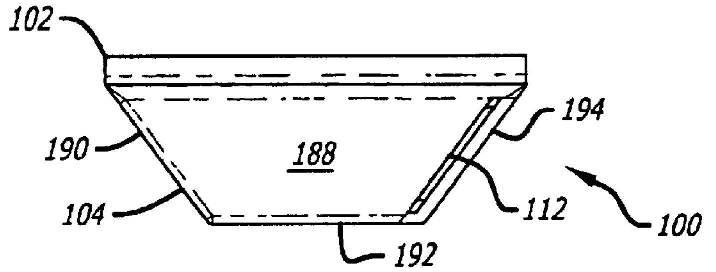
FIGS. 4A–4C are front, side and top views, respectively, of the blade dispenser assembly of FIG. 1.
Figure 4A:
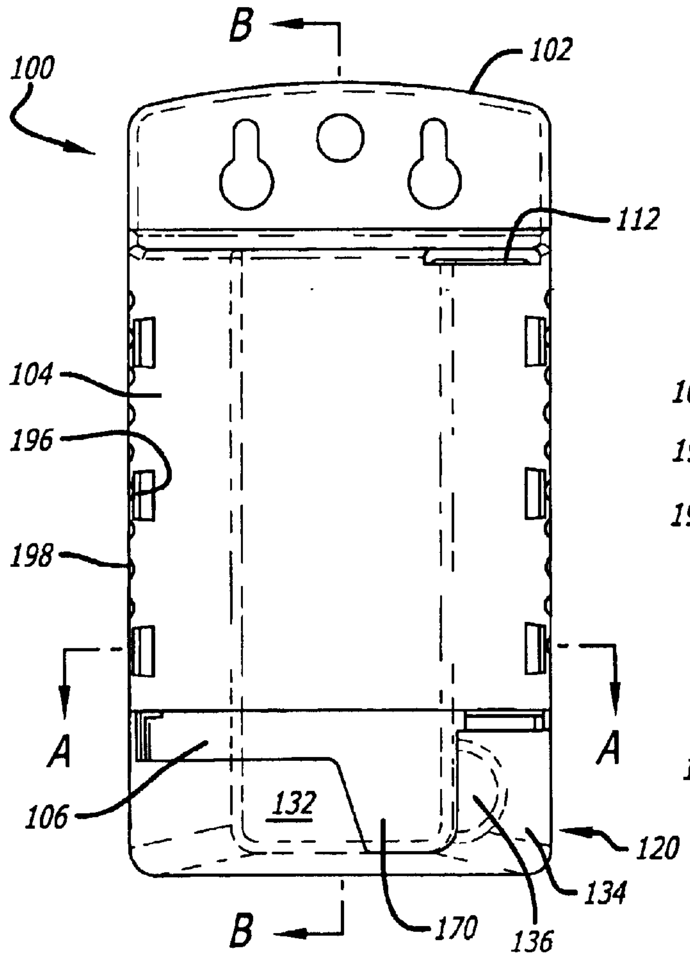
Figure 4B:
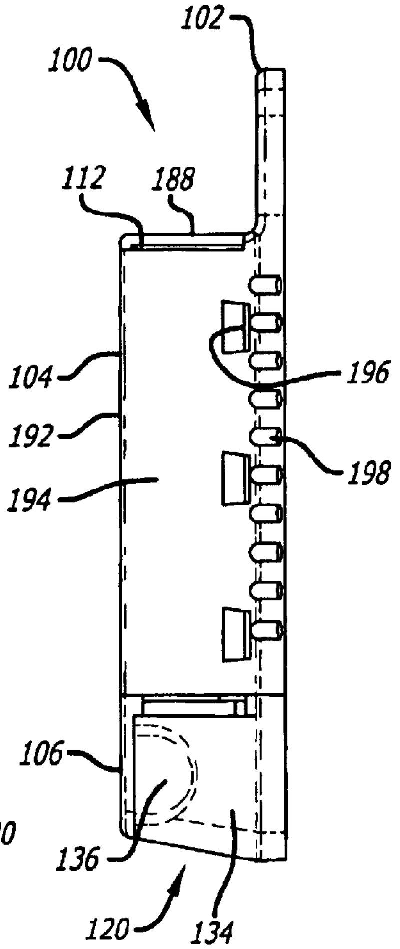
Figure 4G:
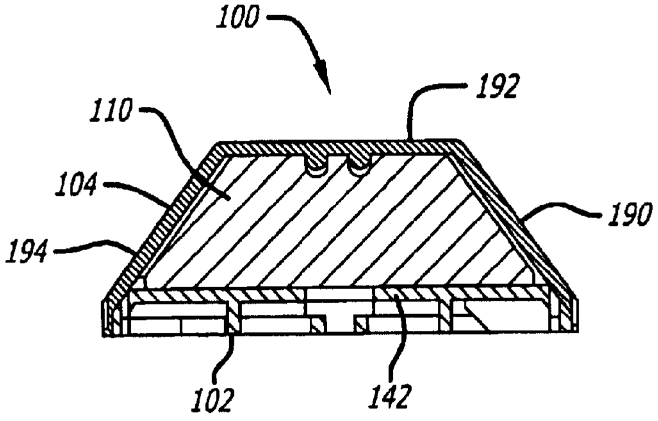
FIG. 4G is a cross-sectional view of the blade dispenser assembly along line C—C of FIG. 4E.
Figure 4F:
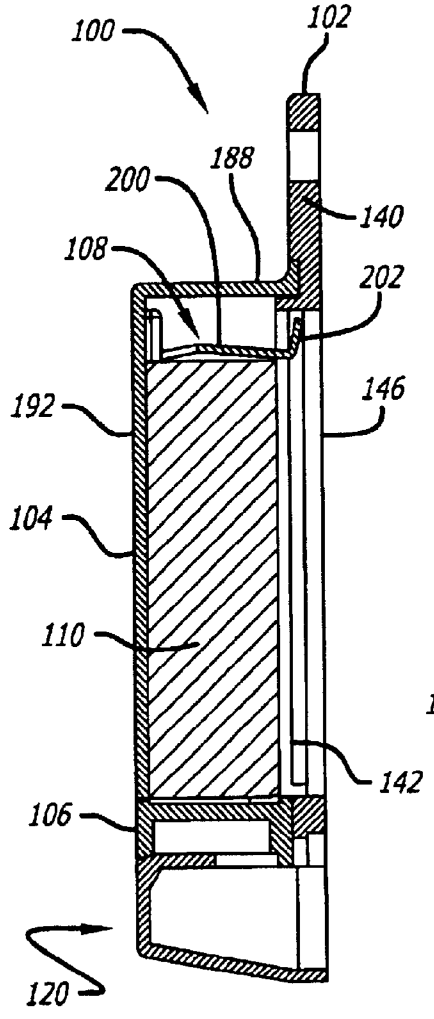
FIG. 4F is a cross-sectional view of the blade dispenser assembly along line B—B of FIG. 4A.
Figure 4E:
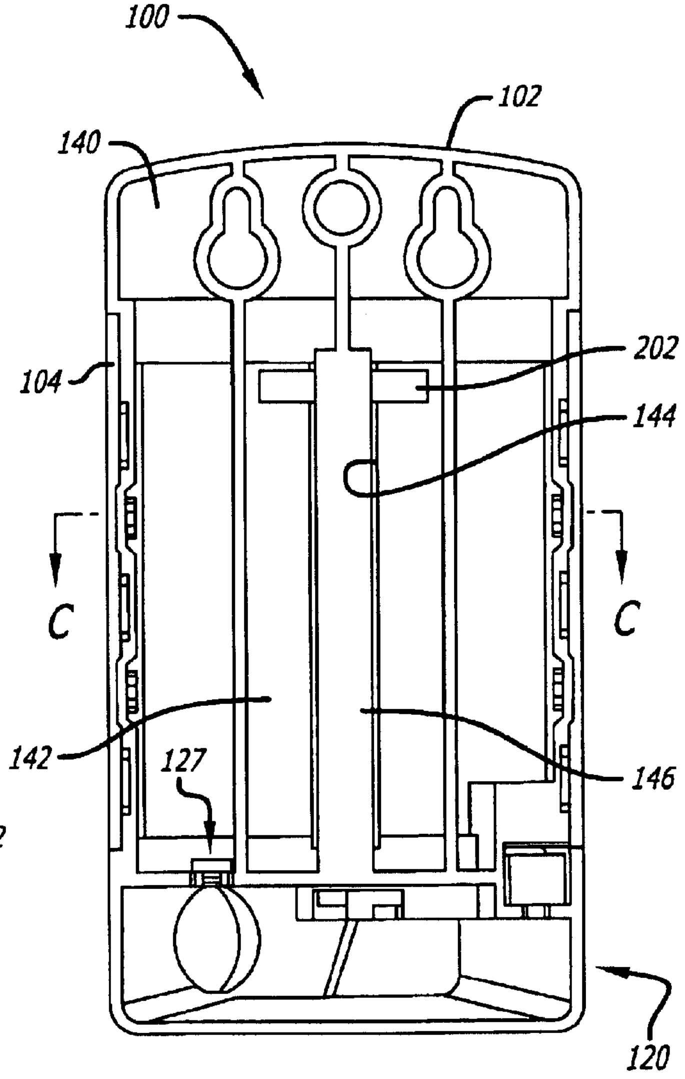
FIG. 4E is a back view of the blade dispenser assembly of FIG. 1.
Figure 6:
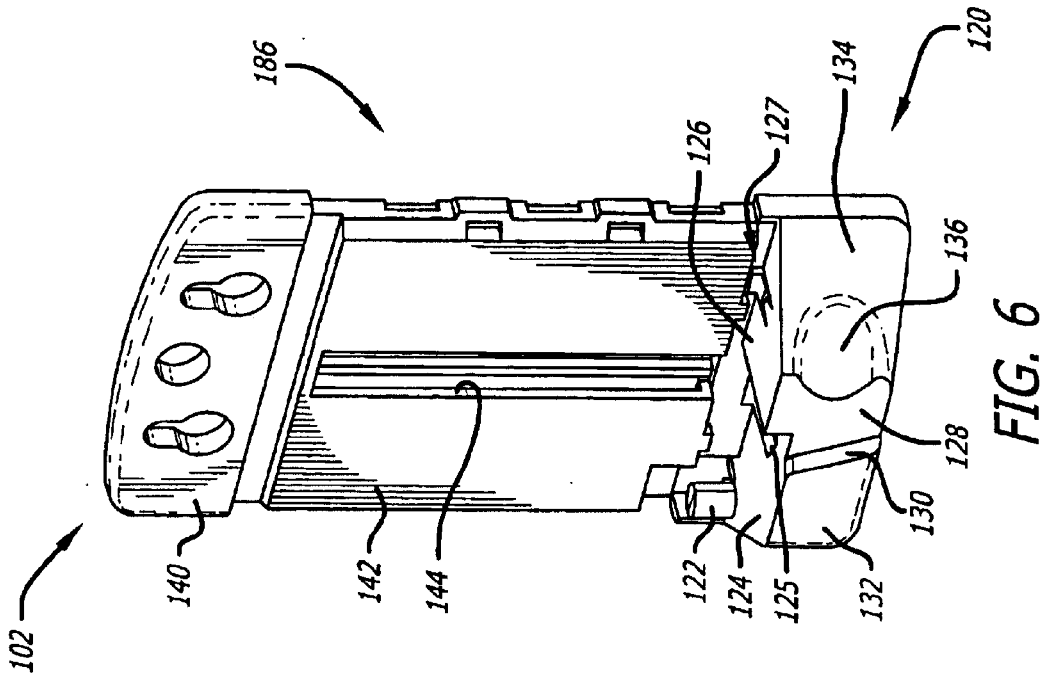
FIGS. 5 and 6 are back and front perspective views, respectively, of the back cover of the blade dispenser assembly of FIG. 1.
Figure 5:
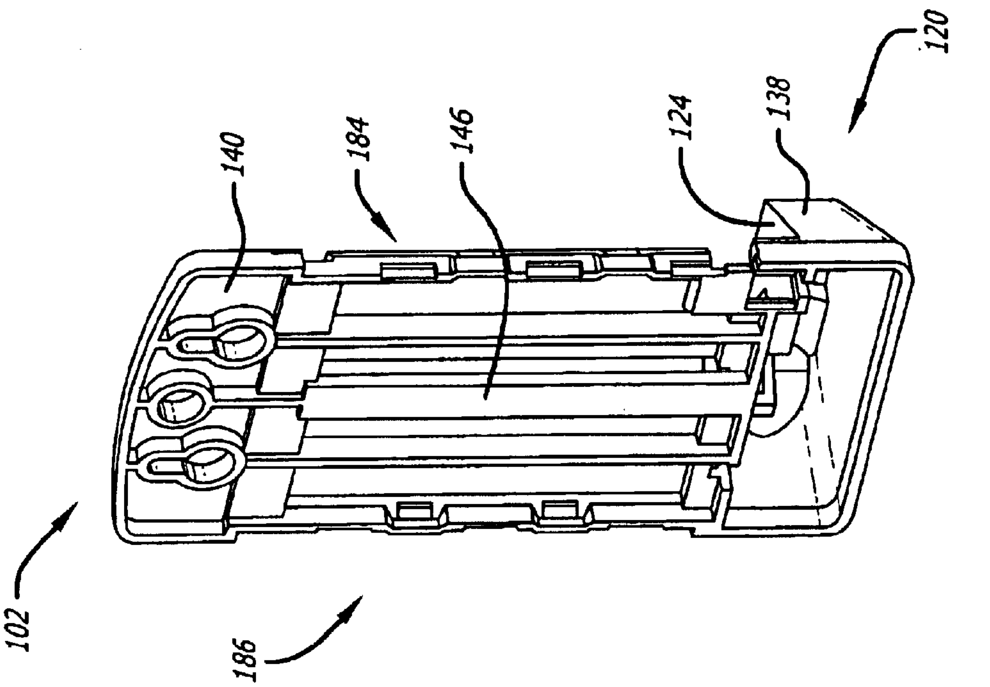
Figure 7D:
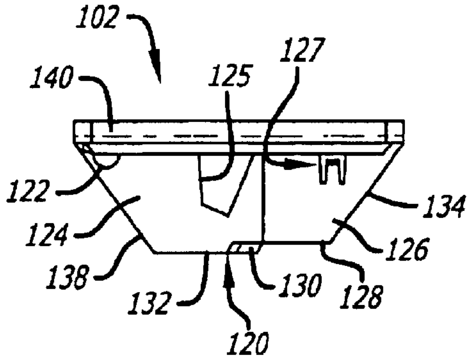
FIGS. 7A–7E are front, side, back, top and bottom views, respectively, of the back cover of the blade dispenser assembly of FIG. 1.
Figures 7A, 7B, 7C:
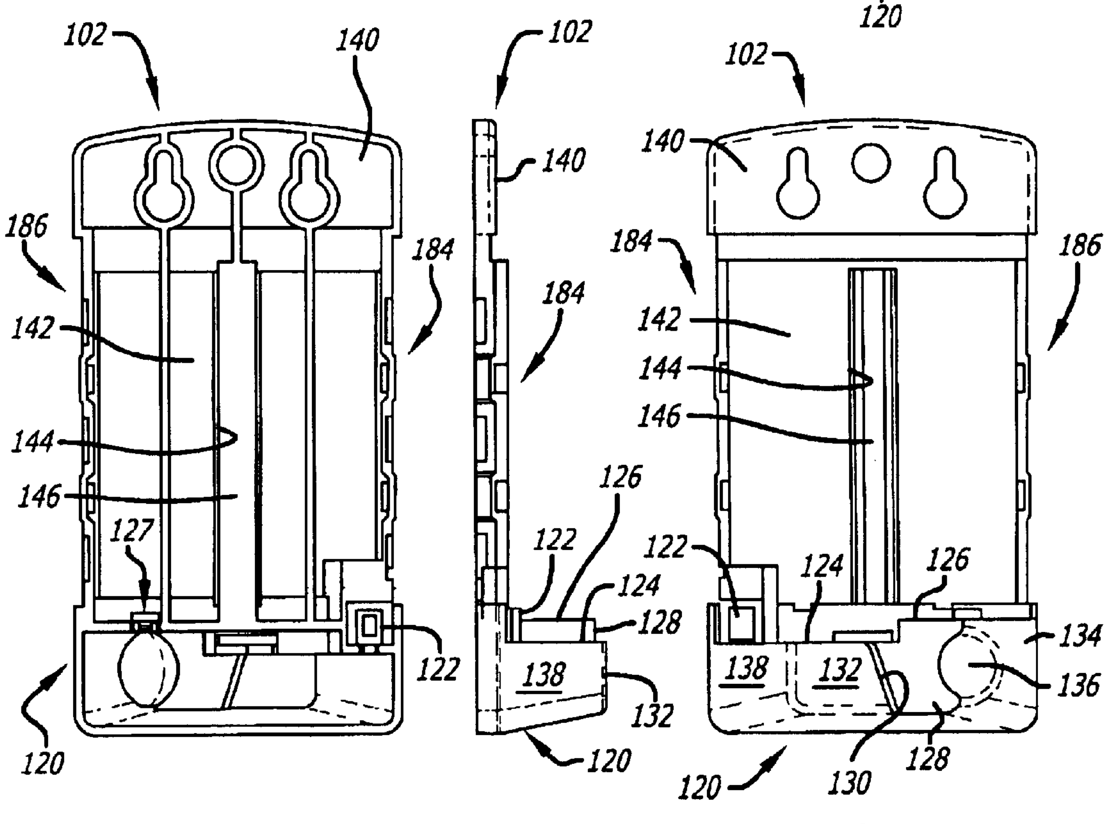
Figure 7E:
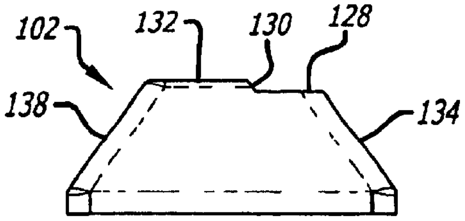
Figure 9:
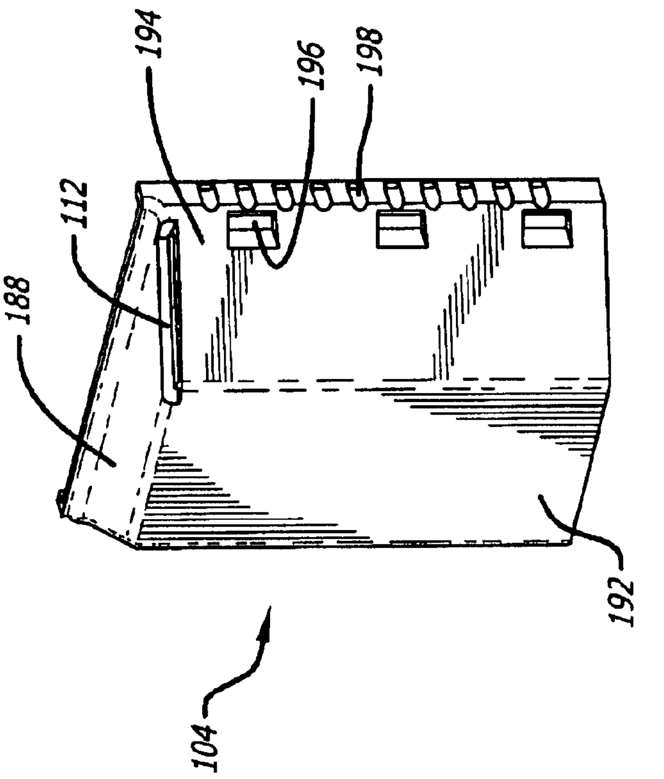
FIGS. 8 and 9 are back and front perspective views, respectively, of the front cover of the blade dispenser assembly of FIG. 1.
Figure 8:
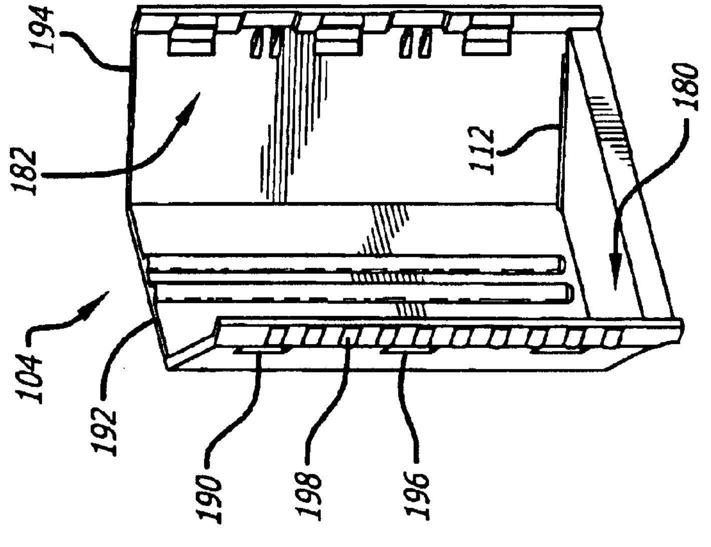
Figures 10A, 10B, 10C, 10D, 10E, 10F:
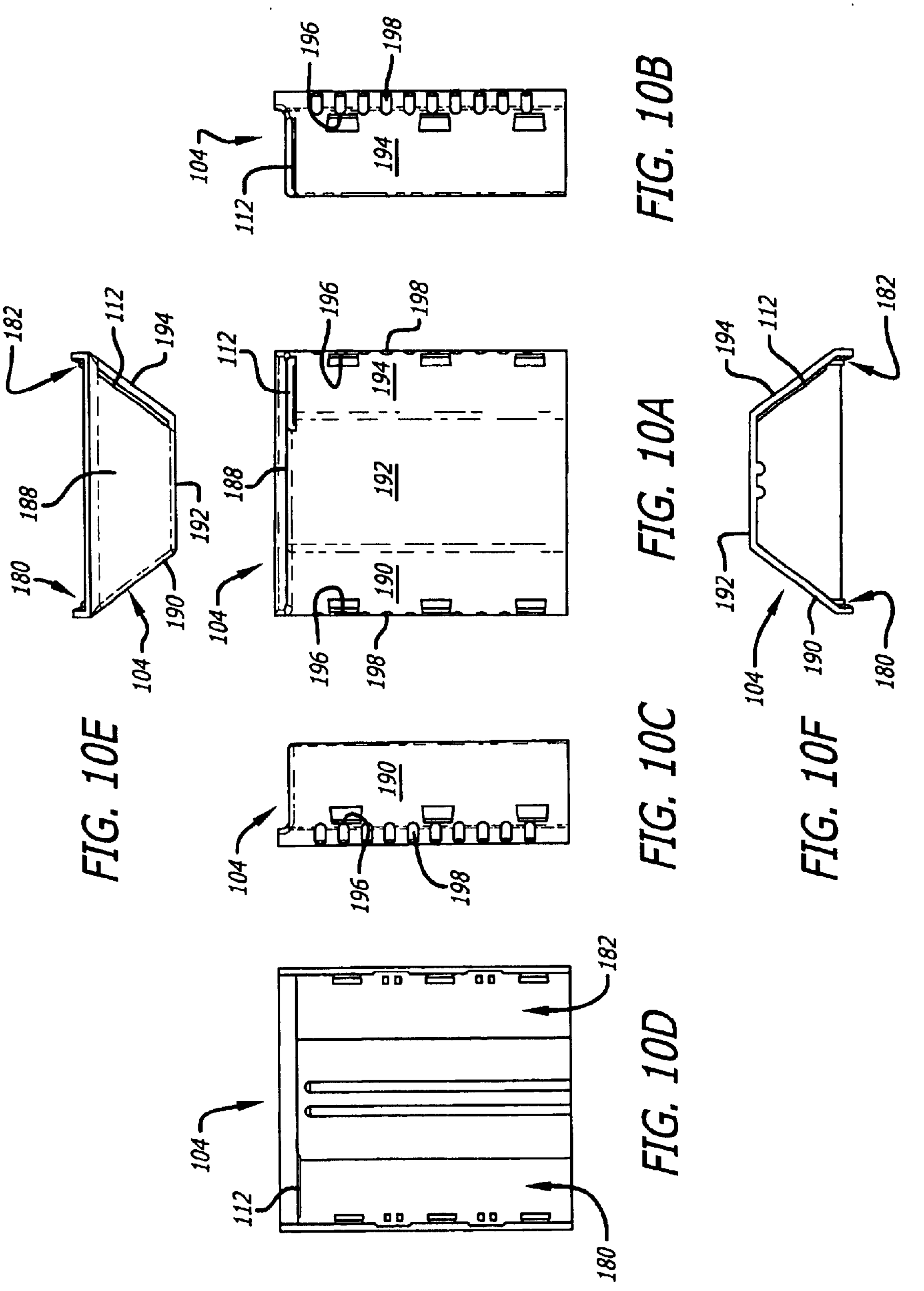
FIGS. 10A–10F are front, right side, left side, back, top and bottom views, respectively, of the front cover of the blade dispenser assembly of FIG. 1.
Figure 11:
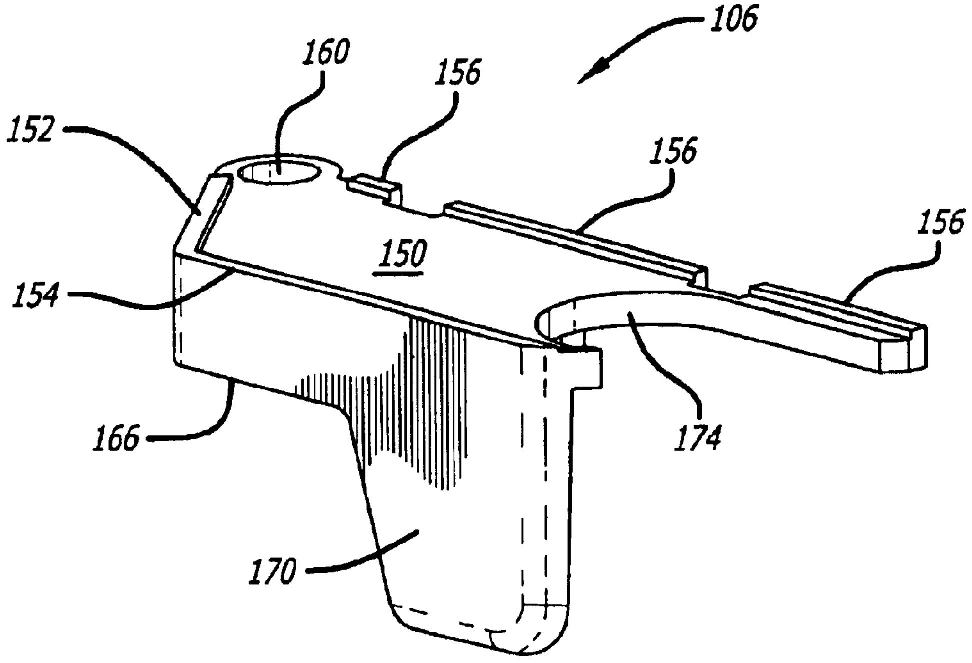
FIGS. 11 and 12 are top and bottom perspective views, respectively, of the shuttle mechanism of the blade dispenser assembly of FIG. 1.
Figure 12:
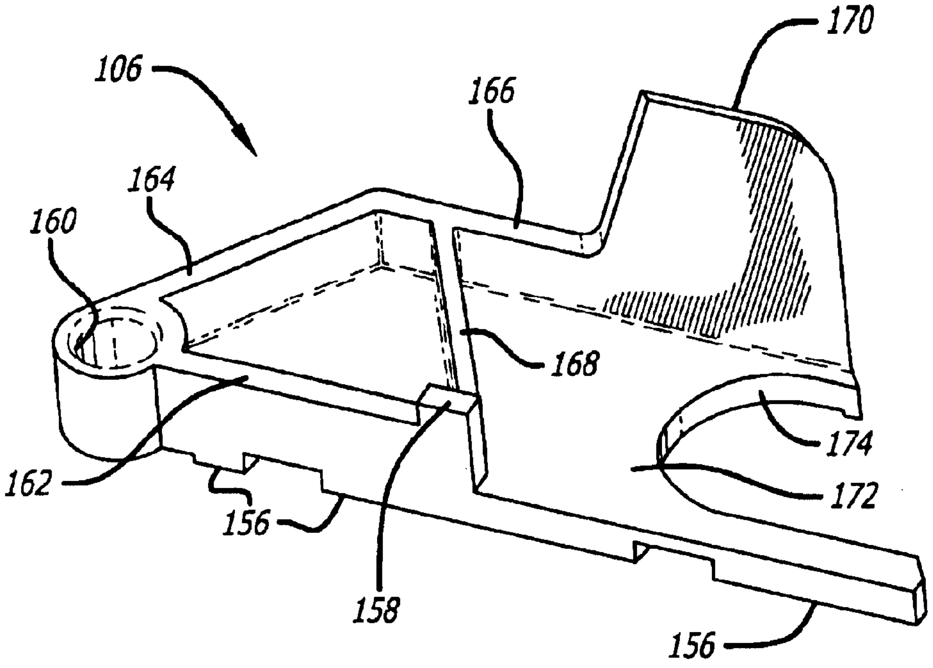
Figure 13B:
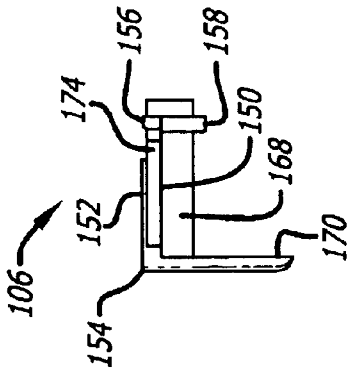
FIGS. 13A–13E are front, right side, left side, top and bottom views, respectively, of the shuttle mechanism of the blade dispenser assembly of FIG. 1.
Figure 13D:
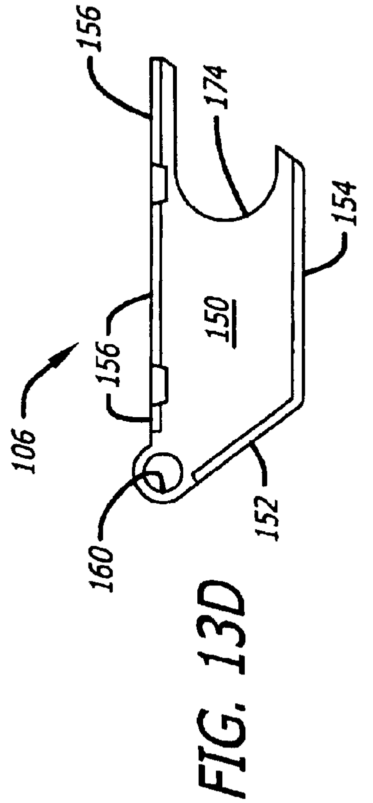
Figure 13A:
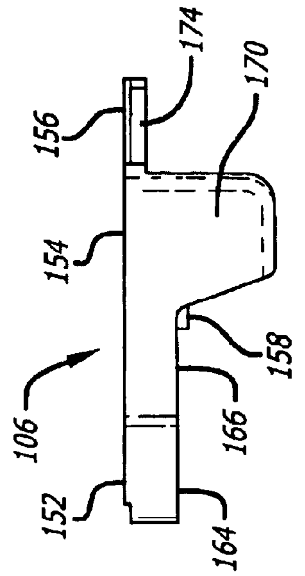
Figure 13E:
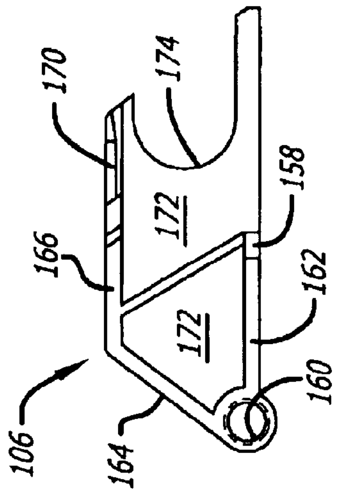
Figure 13C:
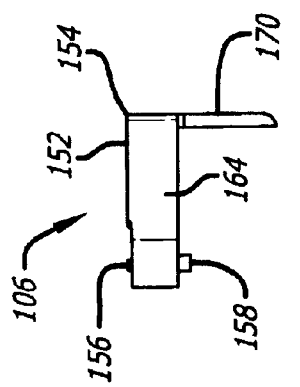
Figure 14:
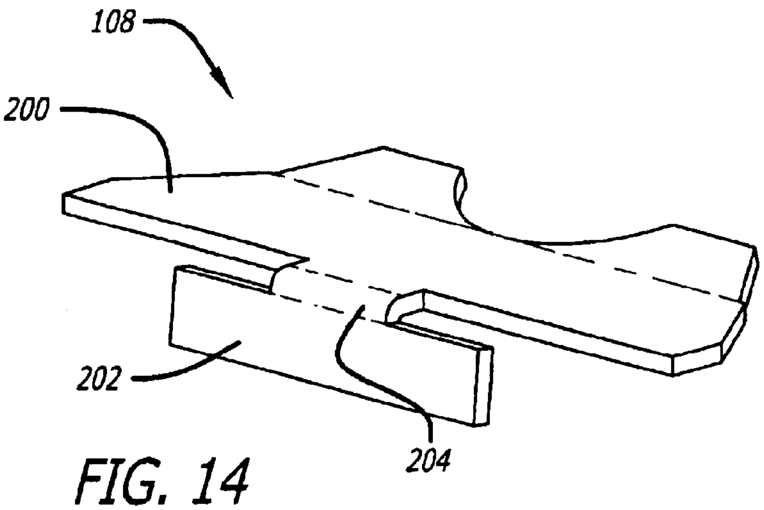
FIG. 14 is a front perspective view of the follower mechanism of the blade dispenser assembly of FIG. 1.
Figure 15C:
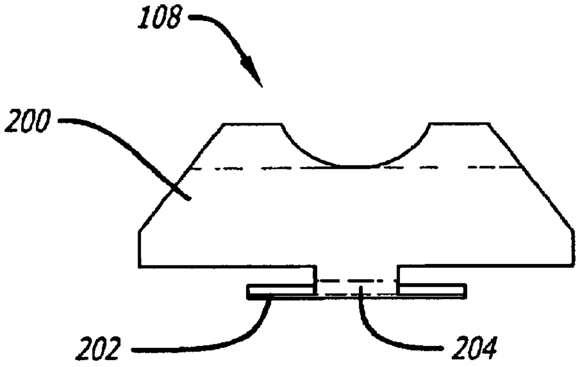
FIGS. 15A–15C are front, side and top views, respectively, of the follower mechanism of the blade dispenser assembly of FIG. 1.
Figure 15B:
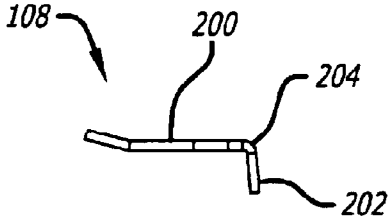
Figure 15A:
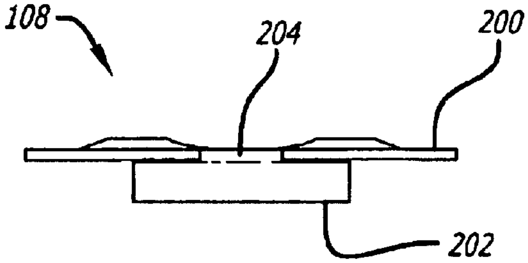

Referring to FIGS. 1–3, an exemplary preferred blade dispenser assembly 100 according to the present invention includes a back cover 102, a front cover 104, a shuttle mechanism 106 and a follower mechanism 108. The back cover 102 and the front cover 104 are shaped such that when they are assembled together they form a housing that receives and provides lateral support for a stack 110 of razor blades. The shuttle mechanism 106 provides longitudinal support for the stack 110 and is mechanically coupled to the back cover 102 such that it can be moved back and forth from a closed position (FIG. 1) to an opened position (FIG. 2). The shuttle mechanism 106 is shaped to perform the functions of engaging the bottommost blade of the stack 110 when in the closed position and withdrawing this engaged blade from the bottom of the stack 110 when moved toward the opened position. The follower mechanism 108 is positioned on top of the stack 110 of blades and, by virtue of its shape and how it mechanically interfits with portions of the back cover 102, functions as a one-way ratchet that descends adjacent the topmost blade of the stack 110 as the stack decreases in height. The follower mechanism 108 also defines and functions as a partition between a lower portion of the housing, within which the stack 110 of blades is positioned, and an upper portion of the housing, within which used blades can be discarded. Accordingly, in the illustrated exemplary blade dispenser assembly 100, the front cover 104 is formed with an aperture 112 sized to facilitate the insertion of used razor blades into the upper portion of the housing.

Referring also to FIGS. 4A–4G, 5, 6 and 7A–7E, the back cover 102 includes a lower front portion 120 that is formed with a plurality of surfaces some of which are complementary to the shape of the shuttle mechanism 106. In the illustrated exemplary blade dispenser assembly 100, the lower front portion 120 includes a cylindrical post member 122, a first shuttle support surface 124 (which is preferably formed with a groove 125 as shown), a second shuttle support surface 126 (which is preferably formed with a safety latch 127 as shown) and front recessed surfaces 128, 130 which are all complementary in shape to various surfaces of the shuttle mechanism 106. Consequently, a lower front surface 132 of the back cover 102 is flush with a front surface of the shuttle mechanism 106 when the shuttle mechanism is in its closed position. As discussed below in greater detail, the cylindrical post member 122 and the first and second shuttle support surfaces 124, 126 additionally function to support the shuttle mechanism 106, and the cylindrical post member 122 mechanically couples the shuttle mechanism 106 to the back cover 102.

The lower front portion 120 of the back cover 102 also includes a first angled side surface 134 that is formed with a recessed portion 136 as shown. The lower front portion 120 also includes a second angled side surface 138. Preferably, but not necessarily, the first and second angled side surfaces 134, 138 are formed such that they are flush with corresponding angled side surfaces of the front cover 104 when the blade dispenser 100 is assembled. The illustrated exemplary back cover 102 also includes a mounting portion 140 formed with holes and/or some other mechanism for securing the blade dispenser assembly 100 to a wall or other surface.

The illustrated exemplary back cover 102 additionally includes a blade contact piece 142 that spans between the lower front portion 120 and the mounting portion 140. The blade contact piece 142 is preferably formed as shown with a vertical channel 144, and the back cover 102 further includes a guide member 146 that faces the vertical channel 144. The vertical channel 144 and the guide member 146 are further discussed infra with reference to the follower mechanism 108.

Referring also to FIGS. 11, 12 and 13A–13E, the illustrated exemplary shuttle mechanism 106 includes a blade receiving surface 150 and a plurality of ridges 152, 154, 156 formed thereabout. When the shuttle 106 is in its closed position, the bottommost blade in the stack is engaged, or positioned on the blade receiving surface 150 with the ridges 152, 154, 156 situated thereabout. When the shuttle 106 is moved toward its opened position, the bottommost blade is withdrawn from the stack, i.e., laterally repositioned relative to the stack and extended from the housing along with the blade receiving surface 150. Preferably, the shuttle mechanism 106 is also formed with a stop member 158 that is sized and positioned to fit within the groove 125 in the first shuttle support surface 124. The length of the groove 125 and positioning of the stop member 158 on the shuttle mechanism 106 define the maximum extent to which the shuttle mechanism 106 can be extended from the housing, i.e., the opened position. In the illustrated exemplary embodiment where the shuttle mechanism 106 is formed with a sleeve 160 that fits about the post member 122, contact between the stop member 158 and the end of the groove 125 limits how far the shuttle mechanism 106 can pivot away from the lower front portion 120. The post member 122 and sleeve 160 are preferably formed such that the post provides support at both the top and bottom of the sleeve, thus providing a full bearing surface for pivoting the shuttle.

The shuttle mechanism 106 is preferably formed with a plurality of surfaces that are complementary to surfaces of the back and front covers 102, 104. The illustrated exemplary shuttle mechanism 106 includes perimeter support rails 162, 164, 166 and a diagonal support rail 168. The perimeter support rail 162 spans from the stop member 158 to the sleeve 160. The perimeter support rail 164 spans between another portion of the sleeve 160 and the perimeter support rail 166. The diagonal support rail 168 spans between the perimeter support rail 166 and the stop member 158. The illustrated exemplary shuttle mechanism 106 is also formed with an arm portion 170 that continues from the perimeter support rail 166 and also extends downward. Preferably, the arm portion 170 is sized to fit against the front recessed surfaces 128, 130 of the back cover 102 such that the arm portion 170 and the lower front surface 132 of the back cover 102 are flush when the shuttle mechanism 106 is in its closed position. The illustrated exemplary shuttle mechanism 106 also includes a bottom surface 172 parallel to the blade receiving surface 150. Preferably, the shuttle mechanism 106 is also formed with an indented edge surface 174 that adjoins the blade receiving surface 150 and the bottom surface 172. The indented edge surface 174 allows a user of the blade dispenser assembly 100 to grasp both sides of a blade that has been withdrawn from the stack and carried with the shuttle mechanism 106 to its opened position. Thus, surfaces of the back cover 102 and the shuttle mechanism 106, respectively, that are preferably complementary in shape include: the cylindrical post member 122 and the sleeve 160; the first shuttle support surface 124 and the perimeter support rails 162, 164, 166 and the diagonal support rail 168; the groove 125 and the stop member 158; the second shuffle support surface 126 and the bottom surface 172; and the first and second recessed surfaces 128, 130 and the arm portion 170.

During pivoting of the shuttle mechanism 106 back and forth between its closed and opened positions, the diagonal support rail 168 serves to limit "sagging" of the shuttle mechanism 106 thereby ensuring shuttle movement precision. The safety latch 127 performs a catching function and helps the shuttle mechanism 106 to stay closed when not in use. Significantly, the arm portion 170 extends below the blade receiving surface 150 which keeps a user's hand away from an engaged blade as the blade is being laterally separated from the other blades in the stack. As an added safety feature, the stop member 158 limits movement of the shuttle mechanism 106 such that only a portion of the shuttle mechanism 106 extends from the lower front portion 120 of the back cover 102, even when the shuttle is in its fully opened position. Consequently, a blade that has been carried with the shuttle mechanism 106 to the opened position remains "pinned" between the blade receiving surface 150 and the front cover 104 until it is slid out of the shuttle mechanism 106 by the user. Accordingly, the design of the shuttle mechanism 106 and the integral way in which it mechanically interfaces the other components of the blade dispenser assembly 100 together prevent a blade from accidentally being flying off of the blade receiving surface 150 as the shuttle mechanism 106 is moved toward its opened position.

Referring also to FIGS. 8, 9 and 10A–10F, the front cover 104 is formed in such a manner that it can be fitted to the back cover 102. The illustrated exemplary front cover 104 is formed with left and right inner edge portions 180, 182 that are shaped to snap fit over complementary left and right outer edge portions 184, 186 of the back cover 102, respectively. Other interconnection structures can also be employed for the purpose of securing the front cover 104 to the back cover 102.

In the illustrated exemplary embodiment of the blade dispenser assembly 100, the aperture 112 in the front cover 104 is formed and positioned such that it will be clearly visible from the front, top and side of the assembly. Accordingly, users of the blade dispenser assembly 100 are more likely to also utilize the assembly as a used blade receptacle, rather than dispose of used blades by simply tossing them into the nearest trashcan thereby subject trash collection personnel and others to potential injury. Additionally, labels or other visible indicia (e.g., stickers, silk screening or molded-in lettering with operating instructions, safety warnings, corporate logos, advertisements, etc.) can be applied to the outer surfaces

188, 190, 192, 194 of the front cover. The outer surfaces 190 and 194 are preferably, but not necessarily, formed with recesses 196 which are shaped and positioned to provide contact surfaces for a screwdriver or other tool during removal of the front cover 104 from the back cover 102. Preferably, the front cover 104 is also formed with ridges 198 to provide for better gripping of the blade dispenser assembly 100, and the front cover 104 in particular.

The follower mechanism 108 is mechanically coupled to the housing provided by the back cover 102 and the front cover 104 such that the follower mechanism 108 descends within the housing adjacent a top portion of the stack as blades are successively removed from the bottom of the stack. The follower mechanism 108 is also mechanically coupled to the housing such that when the blade dispenser assembly 100 is turned upside down the follower maintains its position thereby preventing the blades in the stack from falling away from the shuttle mechanism 106. Thus, the follower mechanism 108 functions as a one-way ratchet.

Referring also to FIGS. 14 and 15A–15C, the illustrated exemplary follower mechanism 108 includes a main portion 200, a cantilevered portion 202 and an attaching portion 204 formed as shown. The main portion 200 is shaped to fit within the housing and is positioned on top of the stack of blades. The cantilevered portion 202 is shaped to fit between the vertical channel 144 and the guide member 146. The attaching portion 204 is sized to fit within the vertical channel 144 with the main portion 200 and the cantilevered portion 202 positioned as previously described.

The illustrated exemplary cantilevered portion 202 is generally rectangular in shape and greater in width than in height. The main portion 200 and the cantilevered portion 202 approximately form a right angle. By way of example, the angle formed by the main portion 200 and the cantilevered portion 202 is between 90° and 100°. It should be appreciated, however, that this angle can be varied depending upon the height and thickness of the cantilevered portion 202 and the distance between the vertical channel 144 and the guide member 146.

The blade dispenser 100 can be assembled as follows: First, attach the shuttle mechanism 106 to the lower front portion 120. Next, attach the follower mechanism 108 to the top portion of the blade contact piece 142. Turning the front cover 104 upside down, load a stack of blades, e.g., 100 blades, into the front cover 104. Next, snap together the back cover 102 and the front cover 104. Labels, decorations or the like can be applied to the blade dispenser 100 before or after it is assembled.

With regard to materials, exemplary preferred back and front covers 102, 104 comprise Acrylonitrile-Butadiene-Styrene (ABS) plastic. An exemplary preferred shuttle 106 comprises Poly-Pro. An exemplary preferred follower mechanism 108 comprises steel or aluminum. It should be appreciated, however, that other materials can be employed to fabricate the various components of the blade dispenser assembly 100.

Although the present invention has been described in terms of the preferred embodiment above, numerous modifications and/or additions to the above-described preferred embodiment would be readily apparent to one skilled in the art. It is intended that the scope of the present invention extend to all such modifications and/or additions.

I claim:

1. A blade dispenser assembly, comprising:

a housing sized to receive a stack of blades, the housing including a shuttle support surface; and a shuttle pivotally coupled to the housing and shaped such that a blade from the stack is engaged by the shuttle when the shuttle is in a closed position and such that the blade is drawn from the stack and extended from the housing when the shuttle is moved to an opened position, the shuttle including a support rail configured to limit sagging of the shuttle relative to the shuttle support surface.

2. The blade dispenser assembly of claim 1, further comprising:

a follower mechanism mechanically coupled to the housing such that the follower mechanism descends within the housing adjacent a top portion of the stack as blades are successively removed from the bottom of the stack, the follower mechanism being formed to function as a one-way ratchet such that when the blade dispenser apparatus is turned upside down the follower mechanism maintains its position relative to the housing thereby preventing blades of the stack from falling away from the shuttle mechanism.

3. The blade dispenser assembly of claim 1, wherein the shuttle is positioned beneath the stack.

4. The blade dispenser assembly of claim 1, wherein the shuttle includes a blade receiving surface and a plurality of ridges at peripheral portions of the blade receiving surface.

5. The blade dispenser assembly of claim 1:

wherein the housing includes a front side with a recessed portion; and wherein the shuttle includes an arm portion that fits within the recessed portion when the shuttle is in its closed position.

6. The blade dispenser assembly of claim 1, wherein the shuttle includes a stop member positioned to make contact with a portion of the housing once the shuttle has been pivoted a predetermined amount relative to the housing.

7. The blade dispenser assembly of claim 1:

wherein the housing includes a post member; and wherein the shuttle includes a sleeve that receives the post member therein pivotally coupling the shuttle to the housing.

8. The blade dispenser assembly of claim 7 wherein the post member and sleeve are formed such that a full bearing surface is provided for pivoting the shuttle relative to the housing.

* * * * *